United States Patent
Kiss et al.

(10) Patent No.: US 11,275,426 B2
(45) Date of Patent: Mar. 15, 2022

(54) SYSTEM AND METHOD FOR CONTROLLING POWER MODE TRANSITIONS

(71) Applicant: Arm Limited, Cambridge (GB)

(72) Inventors: Gergely Kiss, Budapest (HU); Balázs Mészáros, Pitvaros (HU); Csaba Kelemen, Gyor (HU)

(73) Assignee: Arm Limited, Cambridge (GB)

( * ) Notice: Subject to any disclaimer, the term of this patent is extended or adjusted under 35 U.S.C. 154(b) by 105 days.

(21) Appl. No.: 16/791,136

(22) Filed: Feb. 14, 2020

(65) Prior Publication Data

US 2021/0255690 A1 Aug. 19, 2021

(51) Int. Cl.
*G06F 1/3234* (2019.01)

(52) U.S. Cl.
CPC .................. *G06F 1/3234* (2013.01)

(58) Field of Classification Search
CPC .................................................... G06F 1/3234
USPC ........................................................ 713/323
See application file for complete search history.

(56) References Cited

U.S. PATENT DOCUMENTS

| | | | |
|---|---|---|---|
| 7,925,905 B2* | 4/2011 | Suurballe | G06F 1/26 713/300 |
| 8,421,501 B1* | 4/2013 | Rien | H03K 19/018521 326/81 |
| 8,823,209 B2* | 9/2014 | Tatsumi | G06F 1/3287 307/41 |
| 2008/0178031 A1* | 7/2008 | Kim | G06F 1/3287 713/330 |
| 2012/0054511 A1* | 3/2012 | Brinks | G06F 1/26 713/310 |

(Continued)

*Primary Examiner* — Robert A Cassity
(74) *Attorney, Agent, or Firm* — Nixon & Vanderhye P.C.

(57) ABSTRACT

A system and method are provided for controlling power mode transitions. The system has a plurality of power domains, where each power domain has one or more components, and a plurality of power controllers, where each power domain is associated with one of the power controllers. For each power domain, the associated power controller controls transition of that power domain between a plurality of power modes. The power controllers are connected by communication links in order to implement a hierarchical relationship between the power controllers that comprises two or more hierarchical levels. Each power controller other than a highest level power controller in the hierarchical relationship is connected by a communication link to an associated higher level power controller at a higher hierarchical level in the hierarchical relationship. Each given power controller is arranged to implement a power mode transition policy in order to control transition of the associated power domain between the plurality of power modes. The power mode transition policy takes into account power mode information received from any other power controller that a given power controller is connected to by a communication link, so as to constrain the power mode transitions within the associated power domain in accordance with the hierarchical relationship. This provides an efficient and effective mechanism for handling transitions in power modes of power domains that are related to each other, but managed by different power controllers.

21 Claims, 17 Drawing Sheets

(56) References Cited

U.S. PATENT DOCUMENTS

| | | | |
|---|---|---|---|
| 2012/0185706 A1* | 7/2012 | Sistla | G06F 1/3203 713/300 |
| 2014/0237276 A1* | 8/2014 | Machnicki | G06F 1/324 713/323 |
| 2015/0331469 A1* | 11/2015 | Ristic | G06F 1/3203 713/323 |

* cited by examiner

Power Mode compatibility of SYS and CPU power modes
y: which state the reference PPU is in.
x: which states the other PPU can be if the reference PPU is in state y.

| SYS ON | SYS FULL_RET | SYS MEM_RET | SYS OFF | CPU ON | CPU MEM_OFF | CPU FUNC_RET | CPU FULL_RET | CPU LOGIC_RET | CPU MEM_RET | CPU OFF |
|---|---|---|---|---|---|---|---|---|---|---|
| y |   |   |   | x | x | x | x | x | x | x |
|   | y |   |   |   |   |   | x | x | x | x |
|   |   | y |   |   |   |   |   |   |   |   |
|   |   |   | y |   |   |   |   |   |   |   |
| x |   |   |   | y |   |   |   |   |   |   |
| x |   |   |   |   | y |   |   |   |   |   |
| x |   |   |   |   |   | y |   |   |   |   |
| x |   |   | x |   |   |   | y |   |   |   |
| x |   |   |   |   |   |   |   | y |   |   |
| x | x | x |   |   |   |   |   |   | y |   |
| x | x | x |   |   |   |   |   |   |   | y |

FIG. 10

Continued on page 13/17

| MGMT PPU | | SYSPPU | | CPUPPU | | |
|---|---|---|---|---|---|---|
| Power Mode | logic | Power Mode | logic | Power Mode | logic | mem |
| ON | ON | FULL_RET | RET | LOGIC_RET | RET | OFF |
| ON | ON | FULL_RET | RET | LOGIC_RET | RET | OFF |
| ON | ON | ON | ON | LOGIC_RET | RET | OFF |
| ON | ON | ON | ON | MEM_OFF | ON | OFF |
| ON | ON | ON | ON | OFF | OFF | OFF |
| ON | ON | OFF | OFF | OFF | OFF | OFF |

Continued on page 14/17

| Generic description | |
|---|---|
| | SYSPPU is FULL_RET in the initial state, because:<br>-CPUPPU logic is RET and CPUPPU is lower-level than SYSPPU, so SYSPPU logic minimum Power Mode is FULL_RET<br>-No request with higher level than FULL_RET for SYSPPU. |
| | CPUPPU minimum Power Mode is set to OFF from RET. No request to higher level Power modes, so CPUPPU intends to perform the LOGIC_RET->MEM_OFF->OFF transition. |
| | SYSPPU wakes because lower level PPU intends to change Power Mode. After SYSPPU is ON, CPUPPU can start transitioning.<br>ON Q-Ch: SYSPPU acknowledges that it entered ON.<br>ON Q-Ch: after the acknowledgement, CPUPPU prevents SYSPPU from exiting ON by means of this channel. (Before SYSPPU can start transitioning to OFF or FULL_RET, a request is sent via the ON Q-Ch for the CPUPPU, and the acceptance of the request is the prerequisite of the transition.) |
| | CPUPPU LOGIC_RET->MEM_OFF transition completed. MEM_OFF->OFF transition begins. |
| | CPUPPU entered OFF and is steady. SYSPPU starts ON->OFF sequence, since there is no request higher level than OFF for SYSPPU. |
| | SYSPPU ON->OFF transition finished. If there is no request higher level than OFF for MGMTPPU, it can switch OFF as well. |

Continued from page 12/17

FIG. 11 (continued)

| Communication channel description | Communication channel description |
|---|---|
| ON Q-Ch description (between SYS and CPUPPU) | RET Q-Ch description (between SYS and CPUPPU) |
| - | CPUPPU makes sure that SYSPPU cannot transition below FULL_RET. |
| CPUPPU requests SYSPPU to wake up (enter ON). CPUPPU waits for SYSPPU acknowledging that it is ON. | CPUPPU makes sure that SYSPPU cannot transition below FULL_RET. |
| CPUPPU makes sure that SYSPPU cannot transition below ON. | CPUPPU makes sure that SYSPPU cannot transition below FULL_RET. |
| CPUPPU makes sure that SYSPPU cannot transition below ON. | CPUPPU allows SYSPPU to transition below FULL_RET. |
| CPUPPU allows SYSPPU to transition below ON. | - |
| - | - |

Continued from page 13/17

SYSTEM AND METHOD FOR CONTROLLING POWER MODE TRANSITIONS

BACKGROUND

The present technique relates to a system and method for controlling power mode transitions.

In particular, a system may be provided that has a plurality of power domains, where each power domain comprises one or more components. In addition, a plurality of power controllers may be provided, where each power domain is associated with one of the power controllers, and the associated power controller is used to control transition of that power domain between a plurality of power modes.

Whilst each of the power controller may be designed so that they can operate independently to control the supply of power to each associated power domain, there may be a certain relationship between the various power domains. Due to this relationship, it may be the case that the power mode of a certain power domain cannot be changed unless one or more other power domains are in a compatible power mode.

It is hence desirable to provide an efficient mechanism that enables the various power controllers to control the power modes of their associated power domains whilst taking into account the relationship between the various power domains, and any constraints that that relationship may place on how the power modes of individual power domains are changed.

SUMMARY

In one example arrangement, there is provided a system comprising: a plurality of power domains, each power domain comprising one or more components; and a plurality of power controllers, wherein each power domain is associated with one of the power controllers, and the associated power controller is used to control transition of that power domain between a plurality of power modes; wherein: the plurality of power controllers are connected by communication links in order to implement a hierarchical relationship between the plurality of power controllers that comprises two or more hierarchical levels, such that each power controller other than a highest level power controller in the hierarchical relationship is connected by a communication link to an associated higher level power controller at a higher hierarchical level in the hierarchical relationship; and each given power controller is arranged to implement a power mode transition policy in order to control transition of the associated power domain between the plurality of power modes, the power mode transition policy taking into account power mode information received from any other power controller that the given power controller is connected to by a communication link, so as to constrain the power mode transitions within the associated power domain in accordance with the hierarchical relationship.

In another example arrangement, there is provided a method of controlling power mode transitions in a system, comprising: providing within the system a plurality of power domains, each power domain comprising one or more components; providing a plurality of power controllers, wherein each power domain is associated with one of the power controllers, and the associated power controller controls transition of that power domain between a plurality of power modes; connecting the plurality of power controllers by communication links in order to implement a hierarchical relationship between the plurality of power controllers that comprises two or more hierarchical levels, such that each power controller other than a highest level power controller in the hierarchical relationship is connected by a communication link to an associated higher level power controller at a higher hierarchical level in the hierarchical relationship; and implementing, within each given power controller, a power mode transition policy in order to control transition of the associated power domain between the plurality of power modes, the power mode transition policy taking into account power mode information received from any other power controller that the given power controller is connected to by a communication link, so as to constrain the power mode transitions within the associated power domain in accordance with the hierarchical relationship.

In a still further example arrangement, there is provided a system comprising: a plurality of power domains, each power domain comprising one or more components; and a plurality of power control means, wherein each power domain is associated with one of the power control means, and the associated power control means is for controlling transition of that power domain between a plurality of power modes; wherein: the plurality of power control means are connected by communication links in order to implement a hierarchical relationship between the plurality of power control means that comprises two or more hierarchical levels, such that each power control means other than a highest level power control means in the hierarchical relationship is connected by a communication link to an associated higher level power control means at a higher hierarchical level in the hierarchical relationship; and each given power control means for implementing a power mode transition policy in order to control transition of the associated power domain between the plurality of power modes, the power mode transition policy taking into account power mode information received from any other power control means that the given power control means is connected to by a communication link, so as to constrain the power mode transitions within the associated power domain in accordance with the hierarchical relationship.

BRIEF DESCRIPTION OF THE DRAWINGS

The present technique will be described further, by way of illustration only, with reference to examples thereof as illustrated in the accompanying drawings, in which:

FIG. 10 illustrates the power mode compatibility of the various power modes of the system power domain and the CPU power domain, for the example power modes illustrated in FIGS. 8A and 8B;

FIG. 11 illustrates an example sequence of transitions in power modes, and the steps taken to achieve those power mode transitions, in accordance with one example implementation;

DESCRIPTION OF EXAMPLES

Figure 1:
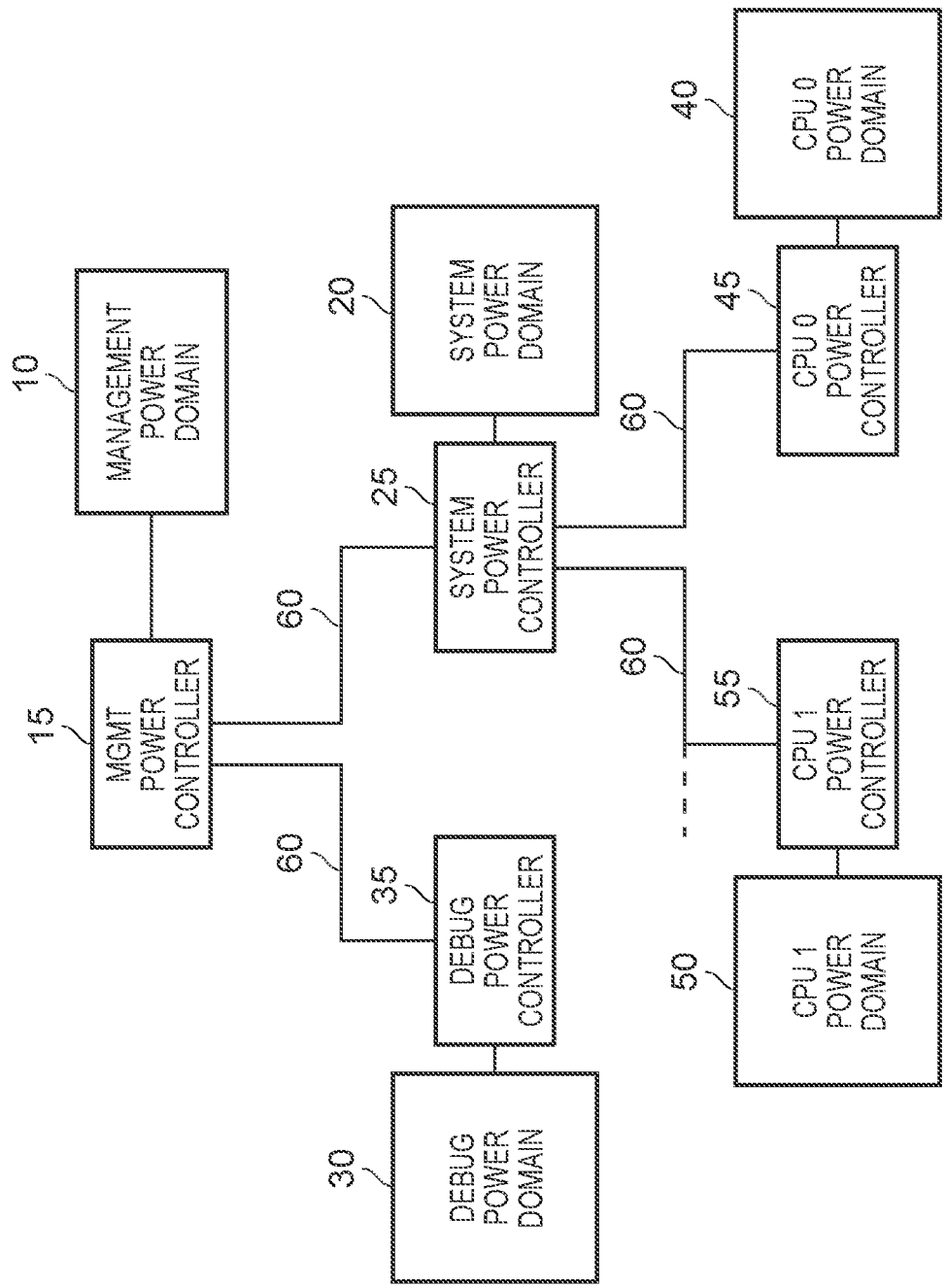
FIG. 1 is a block diagram of a system in accordance with one example arrangement.

In one example implementation, a system is provided that comprises a plurality of power domains, where each power domain comprises one or more components. In addition, a plurality of power controllers are provided, where each power domain is associated with one of the power controllers, and the associated power controller is used to control transition of that power domain between a plurality of power modes. It should be noted that whilst in one example implementation there may be a separate power controller for each power domain, in some implementations one power controller may be associated with more than one power domain, and hence be used to control the supply of power to more than one power domain.

In accordance with the techniques described herein, the plurality of power controllers are connected by communication links in order to implement a hierarchical relationship between the plurality of power controllers that comprises two or more hierarchical levels. In accordance with the hierarchical relationship implemented by the communication links, each power controller other than a highest level power controller in the hierarchical relationship is connected by a communication link to an associated higher level power controller at a higher hierarchical level in the hierarchical relationship.

Further, each given power controller is arranged to implement a power mode transition policy in order to control transition of the associated power domain between the plurality of power modes. The power mode transition policy is arranged such that it takes into account power mode information received from any other power controller that the given power controller is connected to by a communication link. As a result, the power mode transitions within the associated power domain are constrained in accordance with the hierarchical relationship between the power controllers. By connecting the various power controllers via communication links in a manner that implements a hierarchical relationship between the plurality of power controllers, and then exchanging power mode information between connected power controllers via those communication links, this provides an efficient and effective hardware mechanism for ensuring that any power mode transitions made within a particular power domain are constrained to take into account the relationship between the various power domains. By providing this efficient hardware mechanism, using communication links between the power controllers to implement a hierarchical relationship between them, this avoids the need for the provision of software to seek to support the tight coupling of the multiple power controllers.

The above described technique can be utilised in a variety of different systems that may be implemented using various techniques. The system may for example take the form of an integrated circuit in which the various power domains are provided. As another example, the system could be implemented as a field programmable gate array (FPGA).

There are various triggers that can be used to cause a power controller to consider changing the power mode of its associated power domain. For example, when the power controller is idle, it may be arranged to assess, on an ongoing basis, the minimum power mode that its associated power domain can be placed in, taking into account the power mode information received from any other connected power controllers. If the minimum power mode is lower than the current power mode, then the power controller may implement a change in the power mode of the associated power domain.

Further, each power controller may have a number of request inputs via which it can receive requests as to minimum power modes, and the power controller may then select the highest of the requested power modes and change the power mode of its associated power domain accordingly. The requests can originate from a variety of sources. For example, in some instances the power mode information provided from a connected power controller may itself be a power mode transition request. In addition, when implementing the power mode transition policy, each given power controller may take into account internal condition information of the associated power domain when determining whether a transition of the associated power domain between the plurality of power modes is appropriate. The controller may also receive an external trigger such as an interrupt indicating that a change in the power mode is requested. Furthermore, the inputs received by a given power controller can be driven by components accommodated in other power domains, i.e. power domains that may themselves be controlled by a different power controller.

There are a number of ways in which the power mode information received by the given power controller can be taken into account. In one example implementation, the given power controller is arranged to take the power mode information into account when implementing the power mode transition policy in order to ensure that the associated power domain is prevented from being placed in a power mode that is higher than a current power mode being employed within a power domain associated with a higher level power controller connected to the given power controller.

As another example, the given power controller may be arranged to take the power mode information into account when implementing the power mode transition policy in order to ensure that the associated power domain is prevented from being placed in a power mode that is lower than a current power mode being employed within a power domain associated with a lower level power controller connected to the given power controller.

By virtue of the above steps, it can be ensured that when a given power controller wishes to increase a current power mode of its associated power domain, it is first ensured that any connected higher level power controller has placed its associated power domain into an appropriate power mode, so as to ensure that the given power controller does not place its associated power domain in a power mode that is incompatible with the power mode of a power domain controlled by a higher level power controller. Similarly, the above steps ensure that a given power controller does not lower the power mode of its associated power domain if that is incompatible with the power mode of a power domain being handled by a lower level power controller.

Furthermore, the given power controller may be arranged to take the power mode information into account when implementing the power mode transition policy in order to ensure that the given power controller is prevented from implementing a power mode transition of the associated power domain whilst any other power controller that the given power controller is connected to by a communication link is performing a power mode transition in respect of the associated power domain of that other power controller. By such an approach, it is ensured that power controllers at different hierarchical levels that are connected to each other via a communication link cannot transition the power modes of their associated power domains simultaneously. This ensures that any power mode transitions are handled in a reliable manner, alleviating the risk of any instability within the system caused by power mode transitions.

The power mode information can take a variety of forms. However, in one example implementation, the power mode information comprises power mode constraining information issued to the given power controller from an adjacent level power controller at an adjacent level in the hierarchical relationship over the communication link connecting the given power controller and the adjacent level power controller.

This power mode constraining information can be defined in a variety of ways. However, in one example implementation the power mode constraining information indicates to the given power controller a particular power mode, and the given power controller is arranged when implementing the power mode transition policy in the presence of the power mode constraining information, to ensure that the associated power domain is retained in a power mode no lower than the particular power mode. Hence, in this instance the power mode constraining information can indicate a minimum power mode to be employed by the given power controller in respect of the associated power domain.

Such power mode constraining information can be provided in a variety of ways, but in one example implementation the given power controller is arranged to receive the power mode constraining information from one or more connected adjacent level power controllers at an adjacent lower level in the hierarchical relationship. Hence, the power mode constraining information is used by lower level power controllers in the hierarchical relationship in order to indicate to a connected higher level power controller a minimum power level that that higher level power controller should use in association with its associated power domain. This hence ensures that a higher level power controller does not place its associated power domain in a power mode that is too low to support the activities of a power domain whose power is being controlled by a lower level power controller.

In some implementations, it may be possible for the given power controller to receive power mode constraining information from multiple connected adjacent level power controllers. In such instances, the given power controller is arranged to ensure that the associated power domain is retained in a power mode no lower than the highest power mode from amongst the particular power modes specified by the power mode constraining information from the multiple connected adjacent level power controllers.

In addition to power mode information in the form of power mode constraining information, or as an alternative thereto, the power mode constraining information may comprise a power mode transition request issued to the given power controller from the adjacent level power controller to seek to cause the given power controller to change a current power mode of its associated power domain.

There can be a variety of triggers that cause such a power mode transition request to be issued, but in one example implementation the adjacent level power controller is arranged to issue the power mode transition request to the given power controller when the adjacent level power controller wishes to implement a change of power mode for its associated power domain that is currently prohibited by the hierarchical relationship, due to the current power mode of the given power controller's associated power domain.

In one example implementation the given power controller is arranged to issue an acknowledgement signal to the adjacent level power controller when the power mode transition request has been actioned by the given power controller. This hence provides the adjacent level power controller that has made the request with a positive confirmation that the request has been actioned, and hence enables the adjacent level power controller to then determine that it is able to implement any changes in respect of its associated power domain that it was previously prohibited from making until the power mode transition request had been actioned by the given power controller.

In some instances, the power mode transition requests may be mandatory, and accordingly the given power controller may be obliged to process a power mode transition request upon receipt. However, in other implementations, there may be at least certain situations where it is possible for the power mode transition request to be rejected. For instance, if a higher level power controller issues a request to a lower level power controller seeking to cause the lower level power controller to lower the power mode of its associated power domain, the lower level power controller may in some instances be able to reject that request. For example, if a component within the associated power domain is in the process of performing an important task, it may be considered appropriate for that task to complete before any reduction in power mode is made. Accordingly, it may be considered more appropriate to reject the request rather than merely waiting for the component to complete the task.

The adjacent level power controller could then be arranged, in response to receiving such a reject signal, to subsequently reissue the power mode transition request. At this stage, it could for example take into account power mode constraining information received from the given power controller that may itself indicate that the given power controller would at that point be able to process the power mode transition request. Conversely, if the power mode constraining information is consistent with the rejection of the power mode transition request then the adjacent level power controller may be arranged to not reissue the power mode transition request at that point in time, since it will know, based on the power mode constraining information, that that power mode transition request is likely to be rejected.

In one example implementation, the given power controller that receives the power mode transition request may be at a higher level in the hierarchical relationship than the adjacent level power controller that issued the power mode transition request. In such instances, the power mode transition request may be issued by the adjacent level power controller to seek to cause the given power controller to change the current power mode of its associated power domain to a higher power mode. Such a step can be used as a precursor to the adjacent level power controller in due course increasing the power mode of its associated power domain, which it may not be able to do until the given power controller at the higher level in the hierarchical relationship has increased the power mode of its associated power domain.

As another example, the given power controller that receives the power mode transition request may be at a lower level in the hierarchical relationship than the adjacent level power controller that issued the power mode transition request. In such instances, the power mode transition request may be issued by the adjacent level power controller to seek to cause the given power controller to change the current power mode of its associated power domain to a lower power mode. For instance, it may be that the adjacent level power controller wishes to reduce its power mode, but cannot do so until the given power controller at the lower level in the hierarchical relationship has reduced the power mode of its associated power domain.

As discussed earlier, each given power controller may be arranged, when implementing the power mode transition policy in order to control transition of the associated power domain between the plurality of power modes, to take into account internal condition information of the associated power domain. Hence, by way of example, if a request is received seeking to cause a transition in the power mode of the associated power domain, but the given power controller determines from internal condition information of its associated power domain that such a power mode would be incompatible with the current activities within that power domain, then it may not implement the change.

Further, each given power controller may be arranged, when implementing the power mode transition policy in order to control transition of the associated power domain between the plurality of power modes, to take into account any external stimulus received by the given power controller. The external stimulus may take a variety of forms, and could for example be an interrupt signal. The external stimulus can originate from a variety of sources, but could for example be a signal that is driven by a power domain that is not controlled by the given power controller. For instance, such an external stimulus could be used to cause the given power controller to wake up an associated power domain that it has currently put into a low power or power off state.

The communication links can take a variety of forms, but in one example implementation are bidirectional communication links. The communication links can also be provided in a variety of ways, and in particular can be coupled to the power controllers in a variety of ways. In one example implementation the communication links are connected to a low power interface of each given power controller.

It may be the case that dedicated interfaces are provided within each given power controller to support the provision of the communication links. However, in an alternative implementation it may be that the power controllers do not contain any such dedicated interfaces that would support the tight coupling of the power controllers to implement the earlier described hierarchical relationship. In one such example implementation, the communication links are implemented by reusing interfaces provided by the power controllers for an alternative purpose. Such an approach can enable existing power controller designs, that do not provide dedicated interfaces for supporting the establishment of the earlier-mentioned hierarchical relationship between the power controllers, to nevertheless implement the techniques described herein.

The interfaces that are reused can take a variety of forms. In one example implementation, the interfaces comprise clock control interfaces and power domain status information interfaces, and hence in such instances the clock control interfaces and the power domain status information interfaces can be used to support the provision, over the communication links, of the power mode information used by each power controller when implementing the power mode transition policy.

As one specific example of the reuse of such a clock control interface, the power controllers may take the form of Power Policy Units (PPUs) developed by Arm Limited, Cambridge, United Kingdom, and such PPUs may provide a clock Q-channel interface. The clock Q-channel interface connects the power controller to a clock controller which gates the clock of the power controller. The power controller can request a clock via this interface. Further, the clock controller can ask the power controller if the clock controller can gate the clock. It has been found that this Q-channel interface, together with the power domain status information interface (the PPU HWSTAT status output), can be reused in order to interconnect the power controllers via the earlier-mentioned communication links in order to implement the hierarchical relationship required by the present techniques.

As another example of reuse of an existing interface, the interfaces may comprise power control interfaces for controlling the supply of power to each power domain controlled by the power controllers. These power control interfaces may be low power interfaces. As a specific example of such a lower power interface, the earlier-mentioned Arm PPUs provide a P-channel interface that is intended for the management of complex power scenarios with multiple transitions. By reusing the P-channel interface to interconnect the power controllers in the above-mentioned hierarchical relationship using communication links, this can enable the techniques described herein to be implemented without needing to provide dedicated interfaces to establish the hierarchical relationship between the power controllers.

Particular examples will now be described with reference to the Figures.

FIG. 1 illustrates a system in accordance with one example implementation. The system can be implemented in a variety of ways, for example as an integrated circuit, or as an FPGA. The various components forming the system are provided within multiple power domains 10, 20, 30, 40, 50, and for each power domain there is an associated power controller 15, 25, 35, 45, 55. The power controllers 15, 25, 35, 45, 55 are used to control the supply of power to their associated power domains 10, 20, 30, 40, 50. Whilst in FIG. 1 there is a separate power controller for each power domain, in an alternative implementation it may be the case that a single power controller is provided in association with more than one power domain.

Whilst the power domains may vary dependent on implementation, in the illustrated example of FIG. 1 there is a management power domain 10, a system power domain 20, a debug power domain 30, and two CPU power domains 40, 50.

Figure 2:
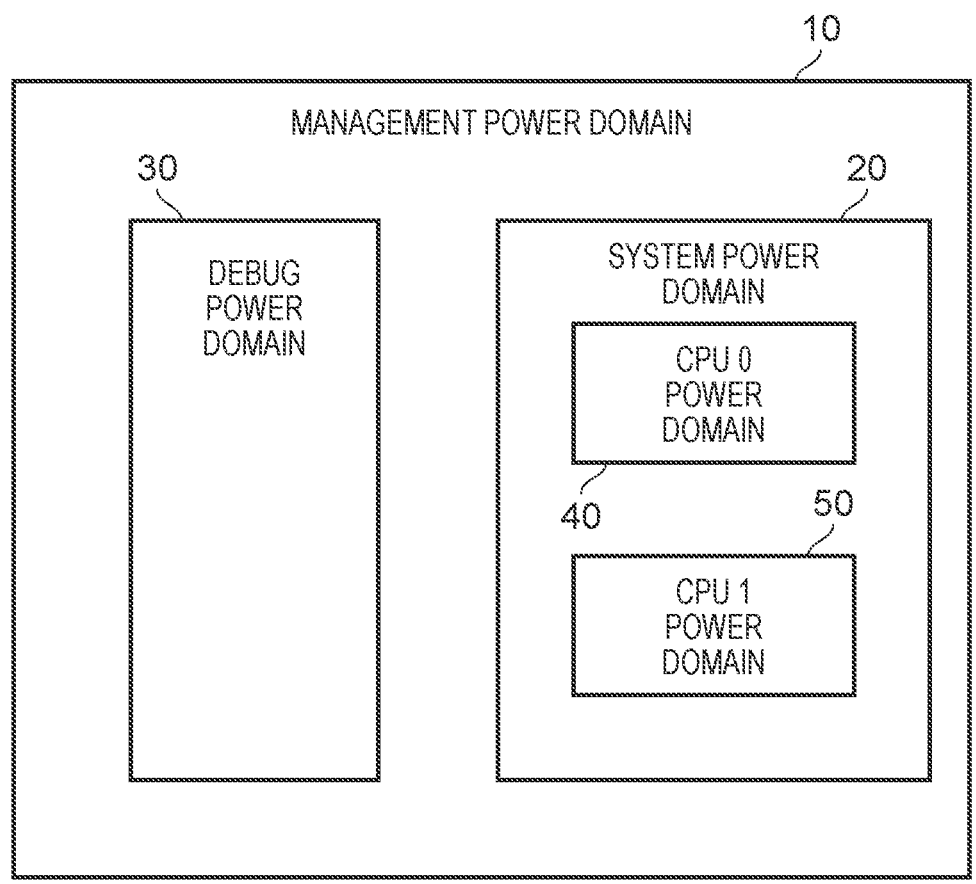
FIG. 2 illustrates the logical relationship of power domains in one example implementation.

FIG. 2 is a diagram schematically illustrating the logical relationship of those power domains. Hence, as can be seen, the management power domain 10 may be considered to logically incorporate the debug power domain 30 and the system power domain 20. The system power domain 20 may itself be logically considered to incorporate a number of other power domains, including for example the CPU 0 power domain 40 and the CPU 1 power domain 50.

Whilst FIG. 2 illustrates the logical relationship between the power domains, as is apparent from the earlier discussed FIG. 1 the various power domains may be provided with their own associated power controllers 15, 25, 35, 45, 55. Whilst those power controllers may be designed so that they can operate independently to control the supply of power to their associated power domain, it is desirable that those power controllers operate so as to take into account the logical relationship between the power domains as illustrated by FIG. 2. In particular, whilst each individual power controller can be used to control the transition of its associated power domain between a plurality of power modes, it is important that any transition in power mode that is made in respect of the associated power domain is compatible with the power mode being used in other related power domains. Purely by way of example, if the CPU 0 power controller 45 wishes to place the CPU 0 power domain 40 into a higher power mode (for example from an off power mode to a retention power mode, or from a retention power mode to a fully on power mode), then it would be appropriate to first make sure that the system power domain 20 was in a compatible power mode, which in turn may require it to be determined that the management power domain 10 is in a compatible power mode. Similarly, if the system power controller 25 wishes to seek to reduce the power mode of the system power domain 20, it will be appropriate to first check that such a change in power mode would not be incompatible with the power modes currently being employed within the CPU 0 power domain 40 in the CPU 1 power domain 50.

In order to enable such information to be taken into account, then as shown in FIG. 1 the various power controllers 15, 25, 35, 45, 55 may be connected together via communication links 60 in order to implement a hierarchical relationship between those power controllers. In accordance with such a hierarchical relationship, each power controller other than a highest level power controller in the hierarchical relationship is connected by a communication link 60 to an associated higher level power controller at a higher hierarchical level in the hierarchical relationship. Hence, as can be seen in FIG. 1, the CPU 0 power controller 45 is connected by a communication link 60 to the system power controller 25 at the adjacent higher level in the hierarchical relationship, and similarly the CPU 1 power controller 55 is also connected by a communication link 60 to the system power controller 25. The system power controller 25 is in turn connected via a communication link 60 to the management power controller 15, in this example the management power controller being at the highest level in the hierarchical relationship. Also as shown in FIG. 1, the debug power controller 35 is connected via a communication link 60 to the management power controller 15.

As will be discussed in more detail with reference to the following figures, various forms of power mode information can be passed over the communication links 60 between connected power controllers, and any given power controller can then take the provided power mode information into account when employing a power mode transition policy in order to control the transition of its associated power domain between the various available power modes. The power mode information can take a variety of forms, but in the examples described herein two forms of power mode information are described. The first form of power mode information is power mode constraining information, and this can be used by a given power controller receiving that power mode constraining information to provide an indication of a required power mode in order to be compatible with the power mode being employed in another power domain controlled by a power controller that has provided that power mode constraining information to the given power controller. Whilst the power mode constraining information can take a variety of forms, in the examples described herein it will take the form of an indication of a minimum power level required in order to achieve such compatibility.

As another example of power mode information, the power mode information may take the form of a power mode transition request that is issued to the given power controller from an adjacent level power controller to seek to cause the given power controller to change a current power mode of its associated power domain. This can be useful, for example, in situations where the power controller that has issued the power mode transition request wishes to make a change to the power mode of its associated power domain, but is currently prohibited from doing so due to the current power mode of the given power controller that receives that power mode transition request.

Figure 3:
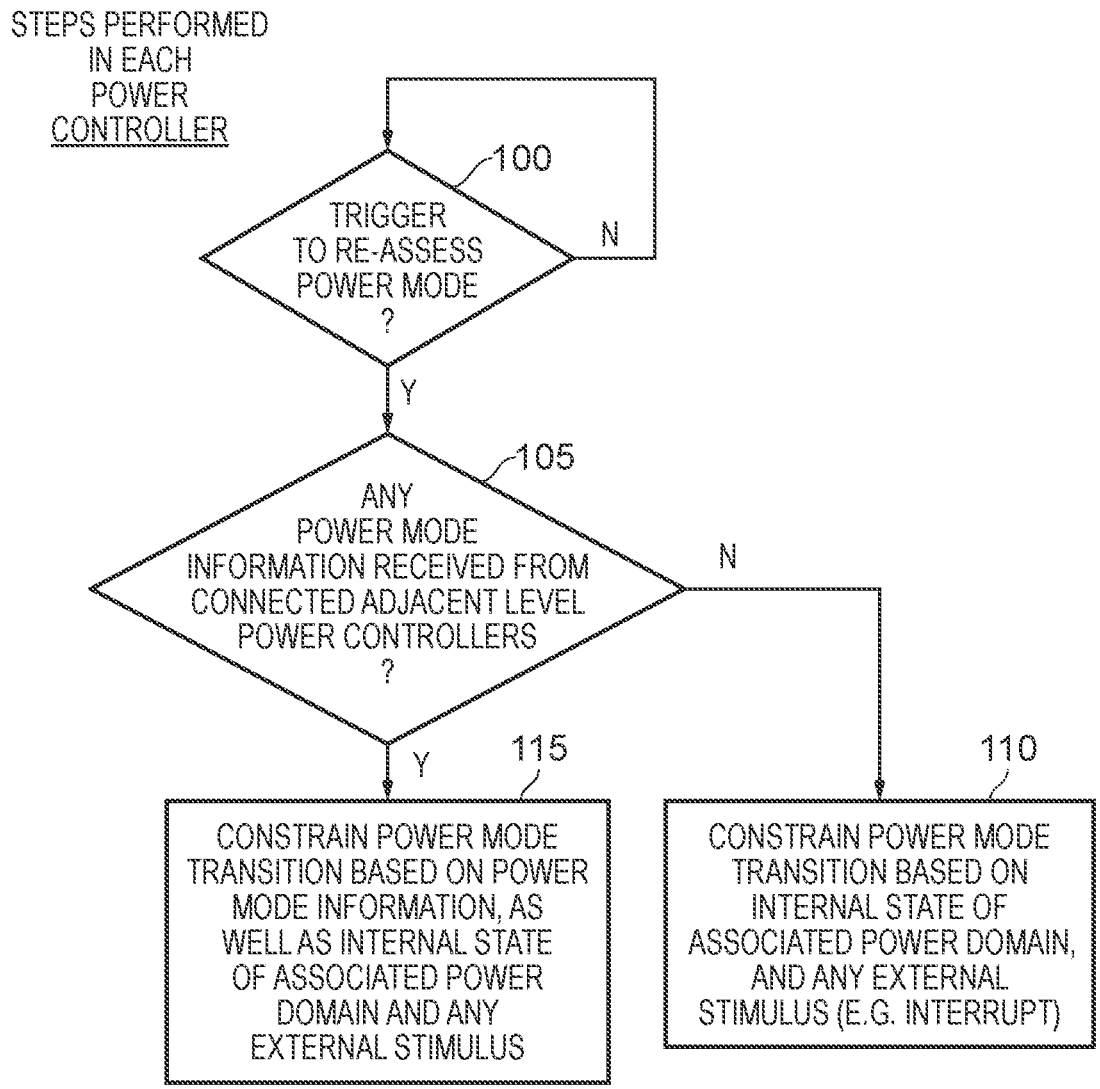
FIG. 3 is a flow diagram illustrating the operation of each power controller in one example implementation.

FIG. 3 is a flow diagram illustrating the basic operation performed by each power controller in order to control the power mode applied to an associated power domain. At step 100, the power controller determines whether a trigger has arisen causing the power controller to reassess the power mode. There are various triggers that can be used to cause a power controller to consider changing the power mode of its associated power domain. For example, when the power controller is idle, it may assess, on an ongoing basis, the minimum power mode that its associated power domain can be placed in, and accordingly in such instances the trigger can occur whenever the power controller is currently idle, i.e. is not in the process of handling a transition in the power mode. As another example, the trigger may arise directly as a result of a request being input to the power controller. An example of such a request would be the earlier-mentioned power mode transition request issued from another power controller connected to that power controller via a communication link. As another example of such a trigger, an externally generated trigger may be received by the power controller, for example an interrupt that may have been raised by components in another power domain, i.e. a power domain not itself controlled by the power controller receiving the interrupt. Processing of such an interrupt could for example cause the power controller to wake up its associated power domain.

Whenever a trigger is detected at step 100, then at step 105 it is determined whether any power mode information has been received from a connected adjacent level power controller. As discussed earlier, this power mode information may be power mode constraining information, such as an indication of a minimum power mode required, or may be a power mode transition request issued from an adjacent power controller in the hierarchy.

If no such power mode information has been received, then as indicated by step 110 the power controller can merely constrain any power mode transition based on any other relevant factors, such as the internal state of the associated power domain, which may itself indicate a minimum power mode that would be required in order to enable the processing being performed by the components within that power domain to take place, or any external stimulus, such as the earlier-mentioned interrupt.

However, if at step 105 it is determined that power mode information has been received from at least one adjacent level power controller, then at step 115 the power mode transitions are constrained not only by the earlier-mentioned internal state and/or external stimulus, but also by the power mode information provided by one or more adjacent level power controllers. The manner in which power mode information is taken into account during the performance of step 115 in one example implementation will be discussed in more detail with reference to the flow diagram of FIG. 4.

Figure 4:
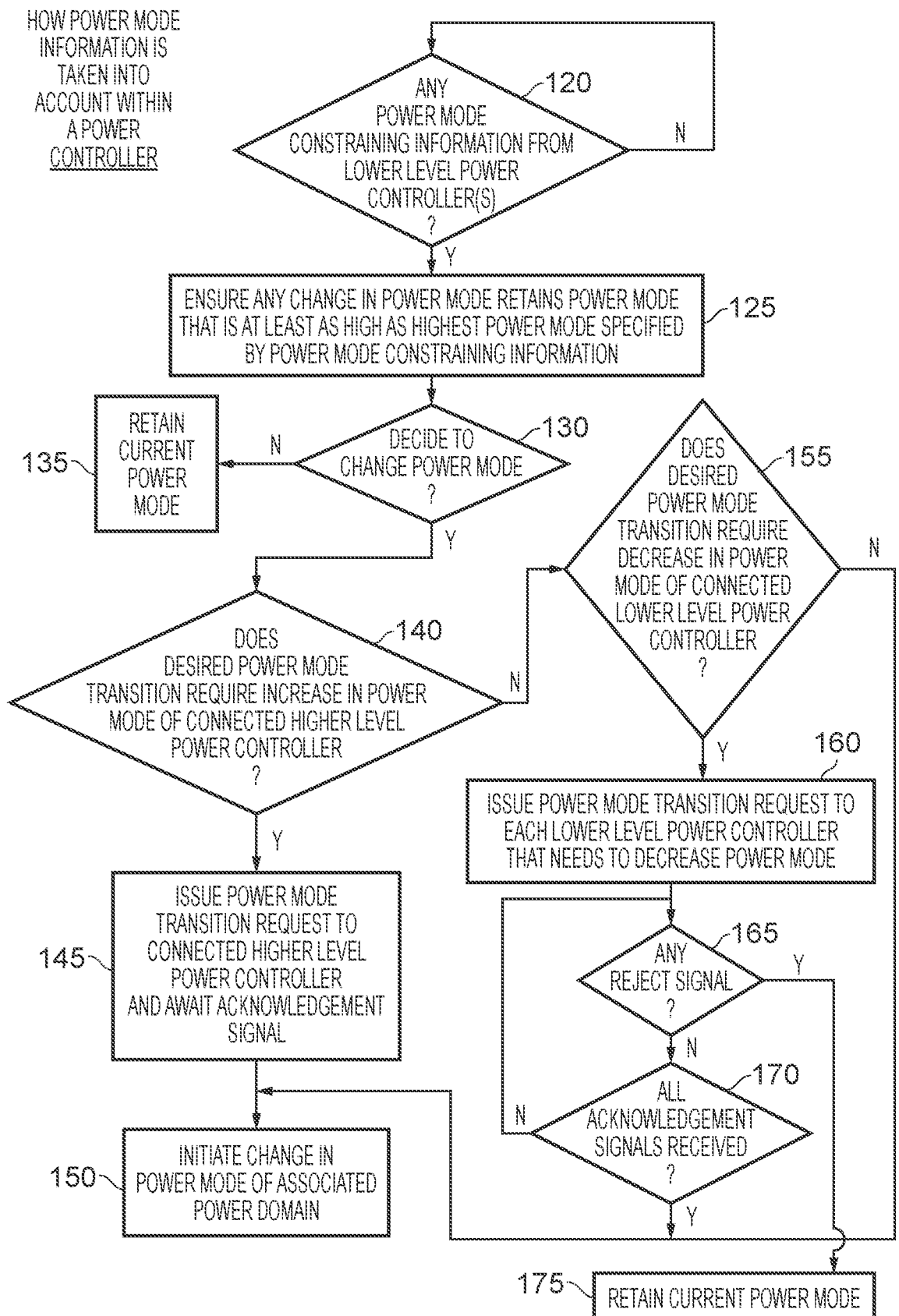
FIG. 4 is a flow diagram illustrating how power mode information may be taken into account within a power controller when performing step 115 of FIG. 3, in accordance with one example implementation.

As indicated by step 120 of FIG. 4, the given power controller implementing the process of FIG. 4 determines whether any power mode constraining information has been provided from lower level power controllers. When that is the case, then, as indicated by step 125, the given power controller ensures that any change in power mode that it decides to implement will retain a power mode that is at least as high as the highest power mode specified by the power mode constraining information. As discussed earlier, the power mode constraining information may identify a lowest power mode required. Hence, if such power mode constraining information is received from multiple power controllers, then the highest of those indicated power modes is taken as the minimum power mode that must be employed within the associated power domain, and that constraint is used when determining at step 125 an appropriate power mode to be used in the associated power domain.

At step 130, it is determined whether, based on the analysis at step 125, any change in power mode is required, and if not then the current power mode is retained at step 135.

However, if the analysis at step 125 causes the given power controller to determine that it does wish to change the current power mode being employed in the associated power domain, then at step 140 it is determined whether the desired power mode transition requires an increase in the power mode of a connected higher level power controller. If so, then at step 145 a power mode transition request is issued from the given power controller to the connected higher level power controller, and thereafter the given power controller awaits an acknowledgement signal from that higher level power controller. The steps performed by the connected higher level power controller upon receipt of that power mode transition request will be discussed later with reference to the flow diagram of FIG. 5. Once the acknowledgement signal is received, then at step 150 the given power controller can initiate the desired change in power mode for the associated power domain.

If at step 140 it is determined that the desired power mode transition does not require an increase in the power mode of a connected higher level power controller, it is determined at step 155 whether the desired power mode transition requires a decrease in the power mode of a connected lower level power controller. If not, then the process can proceed directly to step 150 where the change in the power mode of the associated power domain is initiated.

However, if at step 155 it is determined that a decrease in the power mode of at least one connected lower level power controller is required, then at step 160 a power mode transition request is issued to each lower level power controller that needs to decrease its power mode. The process performed by such a lower level power controller upon receipt of the power mode transition request will be discussed later in more detail with reference to FIG. 6.

Following step 160, it is determined at step 165 whether any reject signal has been received from a lower level power controller to which the power mode transition request has been issued at step 160. If not, it is determined at step 170 whether all acknowledgement signals have been received, i.e. whether each lower level power controller that has received the power mode transition request issued at step 160 has issued an acknowledgement signal to confirm that that power mode transition request has been actioned. The process loops through steps 165 and 170 until either a reject signal is received, or the acknowledgement signals are received. If all the acknowledgement signals are received, then the process proceeds to step 150 where a change in power mode of the associated power domain is initiated. However, in the example shown in FIG. 4, if a reject signal is received at step 165, then at step 175 the given power controller decides to retain the current power mode rather than initiating a change in the power mode.

Whilst not explicitly shown in FIG. 4, when a change in power mode is initiated at step 150, in one example implementation information about that change may be propagated to one or more connected power controllers. For example, if the given power controller changes the power mode of its associated power domain upwards, i.e. to a more on power state, then it may issue a signal to any lower level power controller connected by a communication link to let them know about the transition that has been made. Similarly, if the given power controller decides to reduce the power mode, then it may let any higher level power controller connected via a communication link about the transition. It may also be arranged to inform any connected lower level power controllers of such a decrease in the power mode, for example to let any lower level power controllers know that did not directly need to transition the power mode of their own associated power domains downwards in response to a power mode transition request issued at step 160.

Figure 5:
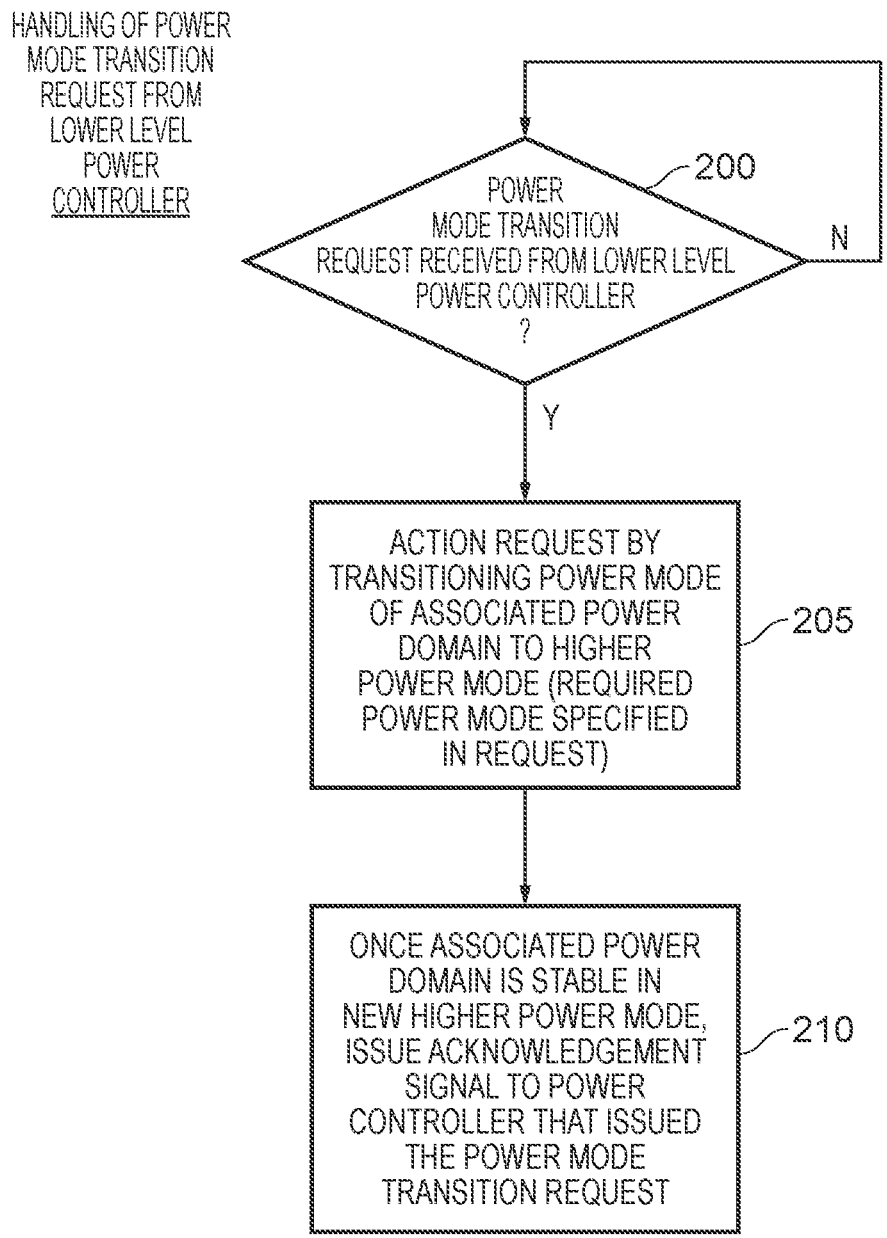
FIG. 5 is a flow diagram illustrating steps performed by a power controller when it receives a power mode transition request from a lower level power controller, in accordance with one example implementation.

FIG. 5 is a flow diagram illustrating how a power controller may be arranged to handle a power mode transition request from a lower level power controller, and in particular illustrates the steps performed by such a power controller in response to a power mode transition request issued at step 145 of FIG. 4. At step 200, the recipient power controller determines whether a power mode transition request has been received from a lower level power controller, and when that is the case the process proceeds to step 205 where the recipient power controller actions the request by transitioning the power mode of its associated power domain to a higher power mode. Whilst the higher power mode that is required may be determined in a variety of ways, in one example implementation that higher power mode is explicitly identified in the power mode transition request. As discussed earlier, the specified power mode may in fact be a minimum power mode, and it may be that in certain instances the action taken at step 205 causes the power mode of the associated power domain to be transitioned to an even higher power mode than that specified. For example, the recipient power controller may in fact simultaneously receive power mode transition requests from multiple lower level power controllers, and in that case will transition the power mode of its associated power domain to the highest of the specified power modes in the various power mode transition requests.

Following step 205, then at step 210 an acknowledgement signal is issued to the power controller that issued the power mode transition request once the power domain is stable in the new higher power mode. Whilst in one example implementation an acknowledgement signal may only be issued to the lower level power controller that issued the power mode transition request, in another example implementation all connected lower level power controllers may be informed about the transition that has been implemented, so that they are then aware of the current power mode being employed in the power domain associated with the higher level power controller.

It should be noted that when actioning the request at step 205, it may in some instances be necessary for the recipient power controller to itself issue a power mode transition request to an even higher level power controller, since in order to make the transition requested by the power mode transition request received at step 200, it may be required for the even higher level power controller to itself transition the power mode of its associated power domain to a higher level.

Figure 6:
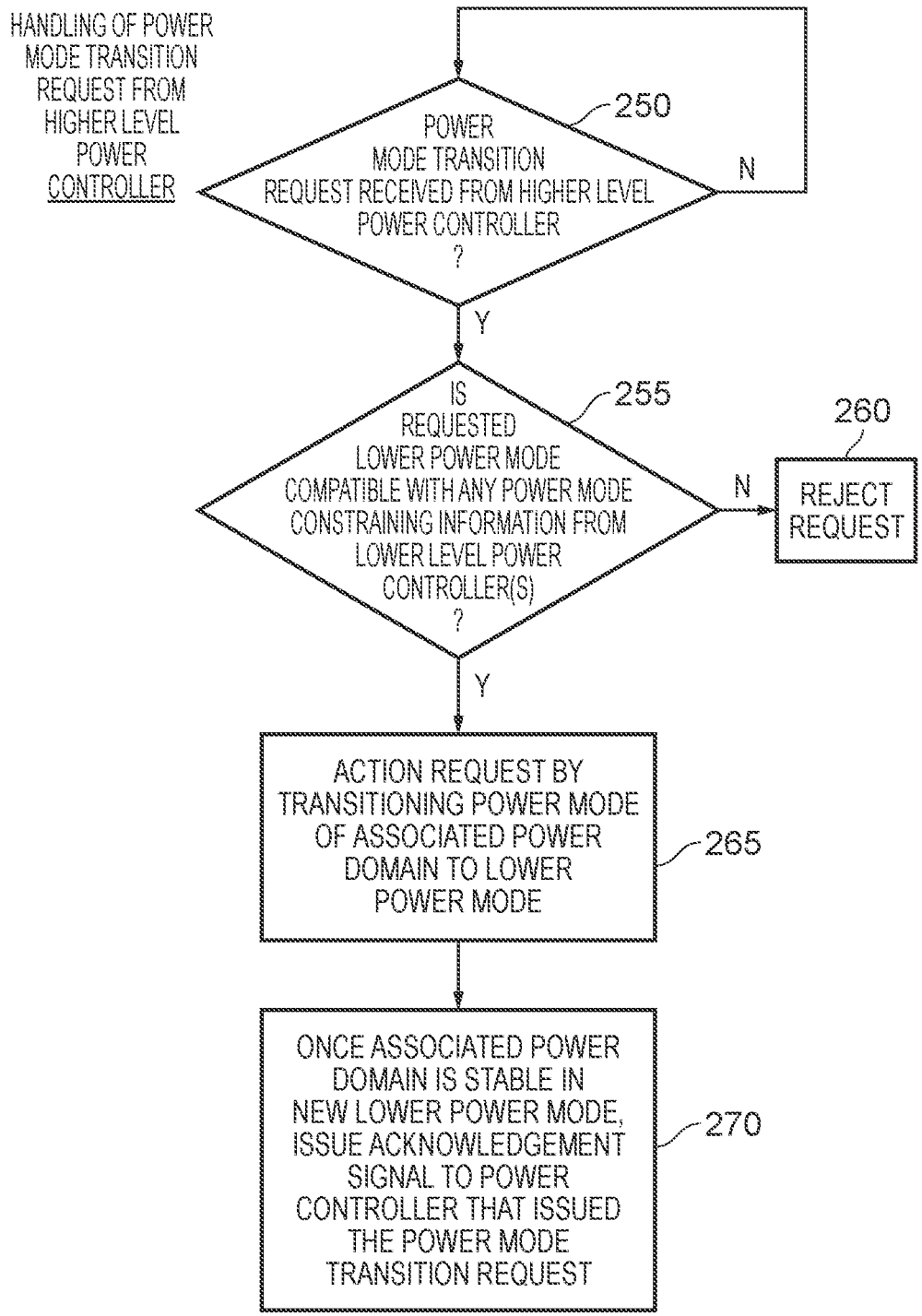
FIG. 6 is a flow diagram illustrating steps performed by a power controller when it receives a power mode transition request from a higher level power controller, in accordance with one example implementation.

FIG. 6 is a flow diagram illustrating how a recipient power controller handles a power mode transition request received from a higher level power controller, and in particular indicates the steps taken to process the power mode transition request issued at step 160 of FIG. 4. At step 250, it is determined whether a power mode transition request has been received from a higher level power controller, and when this is the case it is determined at step 255 whether the requested lower power mode specified by the power mode transition request is compatible with any power mode constraining information from lower level power controllers. If not, then at step 260 the request is rejected. Whilst not explicitly shown in FIG. 6, the recipient power controller can also perform other tests in parallel with step 255 in order to determine whether the requested lower power mode can be entered. For example, it may analyse internal information received from its own associated power domain indicative of the activities being performed by components within the power domain, and if there are certain activities being performed within that power domain that require the power mode to be retained at a higher level than the requested lower power mode, then again the request can be rejected at step 260.

Assuming it is determined at step 255 that there is no reason to reject the request, then at step 265 the request is actioning by transitioning the power mode of the associated power domain to the lower power mode requested. Thereafter, at step 270, once the associated power domain is stable in the new lower power mode, an acknowledgement signal is issued to the power controller that issued the power mode transition request, i.e. the power controller at the adjacent higher level in the hierarchy. As mentioned earlier when discussing FIG. 4, information about the new lower power mode may also be propagated on to any lower level power controllers connected to the recipient power controller that has performed the process of FIG. 6, so that they are aware of the new power mode being employed.

Figure 7:
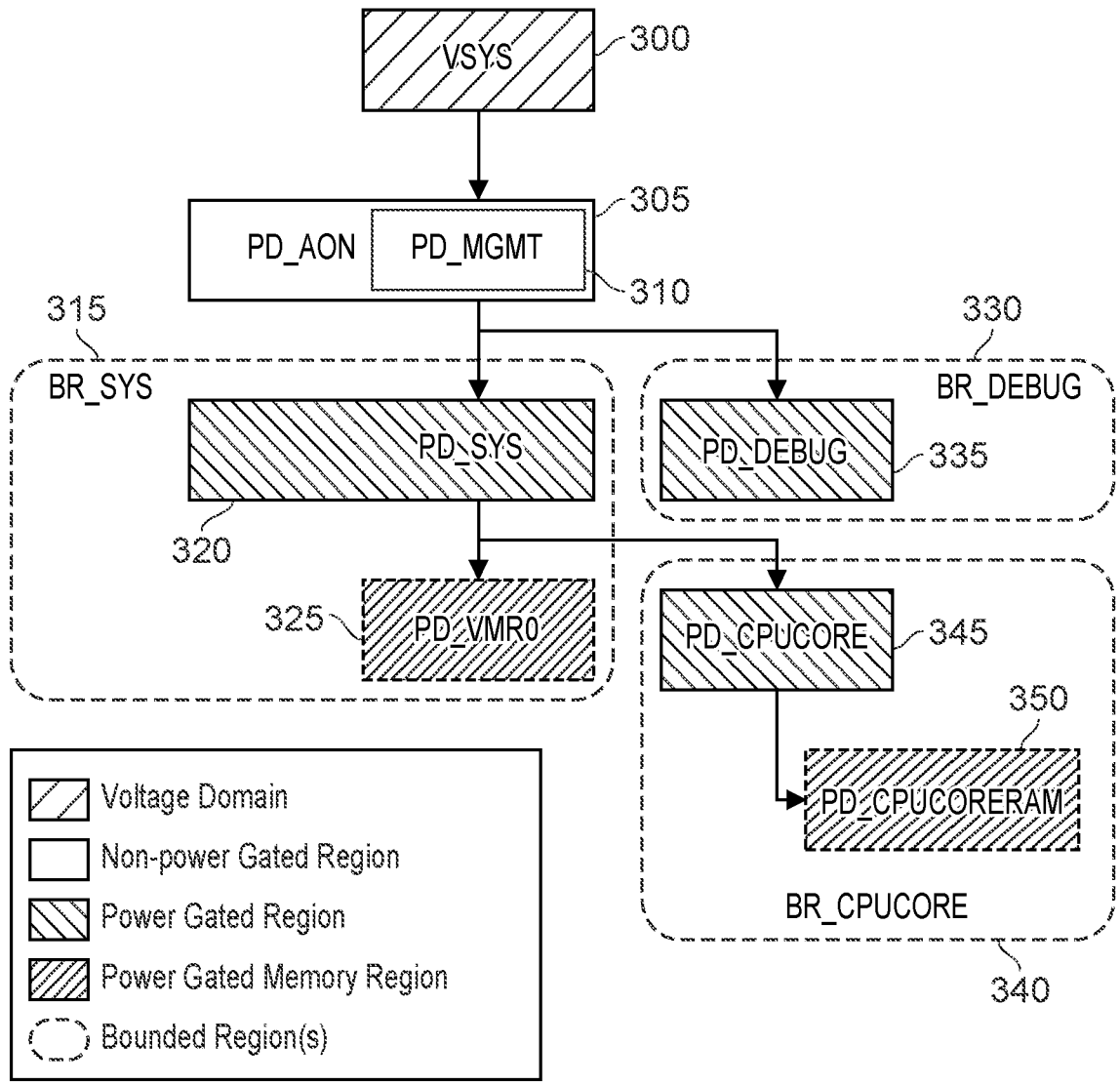
FIG. 7 illustrates an arrangement of power domains in accordance with one example implementation.

FIG. 7 is a block diagram illustrating the voltage and power domain hierarchy of an example subsystem. A voltage domain 300 is provided that is used to supply power to the subsystem. An always on (AON) power domain 305 is then provided that incorporates within it a management power domain 310. The components within the always on power domain and the management power domain are within a non-power gated region. As will be discussed later with reference to FIG. 9, these are the power domains that include the various power controllers discussed earlier. In particular, in one example implementation the management power controller is provided within the always on power domain 305, and the other power controllers are provided within the management power domain 310. However, more generally, a power controller controlling a power domain can be placed in any logically related power domain at a higher level than the power domain controlled by that power controller. Hence, for example the CPU 0 power controller can be in the system power domain or the management power domain, but not in the debug power domain.

As will be apparent from the earlier discussed FIG. 1, a system power domain 320 is controlled by a system power controller, a debug power domain 335 is controlled by a debug power controller, and a CPU core power domain 345 is controlled by a CPU power controller. However, as mentioned earlier, a power controller may be responsible for supplying power to more than just a single power domain. Indeed, in the example shown in FIG. 7, the system power controller is responsible for the control of power to the system bounded region 315, the debug power controller is responsible for the supply of power to the debug bounded region 330, and the CPU power controller is responsible for supply of power to the CPU bounded region 340. As shown in FIG. 7, those bounded regions may include more than just the power domains discussed earlier, which themselves are power gated regions, and hence for example may include other power gated regions such as the power gated memory regions 325, 350. Hence, in general terms it will be seen that bounded regions are a collection of power domains (memory and/or logic) that can be controlled by the same power controller.

Whilst in the example of FIG. 7 all of the various power domains have their power supplied from a common voltage domain 300, this is not a requirement, and in alternative systems there may be separate voltage supplies for at least some of the different power domains.

Figure 8A:
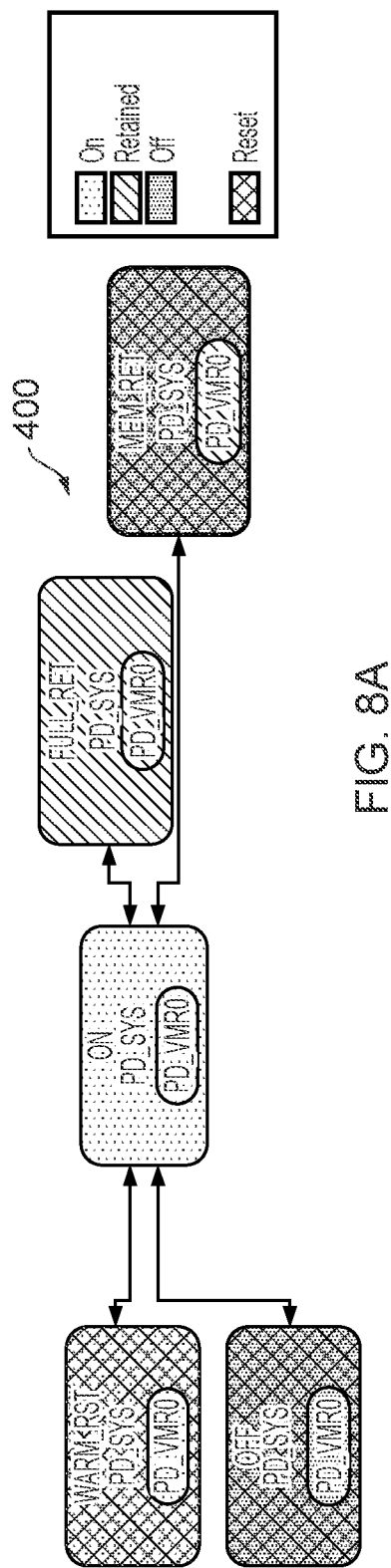
FIGS. 8A to 8C are power mode transition diagrams for the system power domain controller, CPU power domain controller and management power domain controller, respectively, in accordance with one example implementation.
Figure 8C:
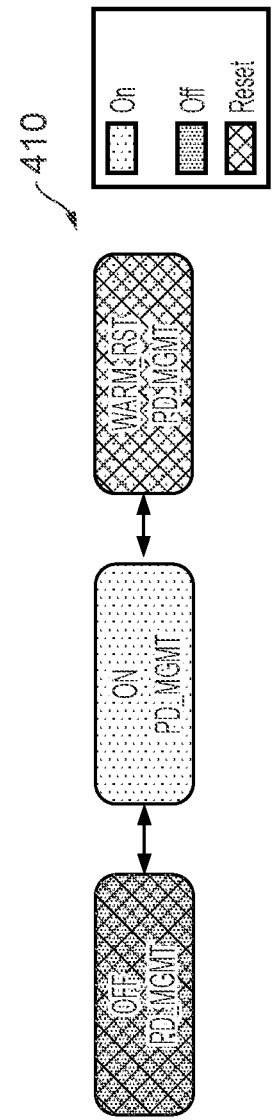
Figure 8B:
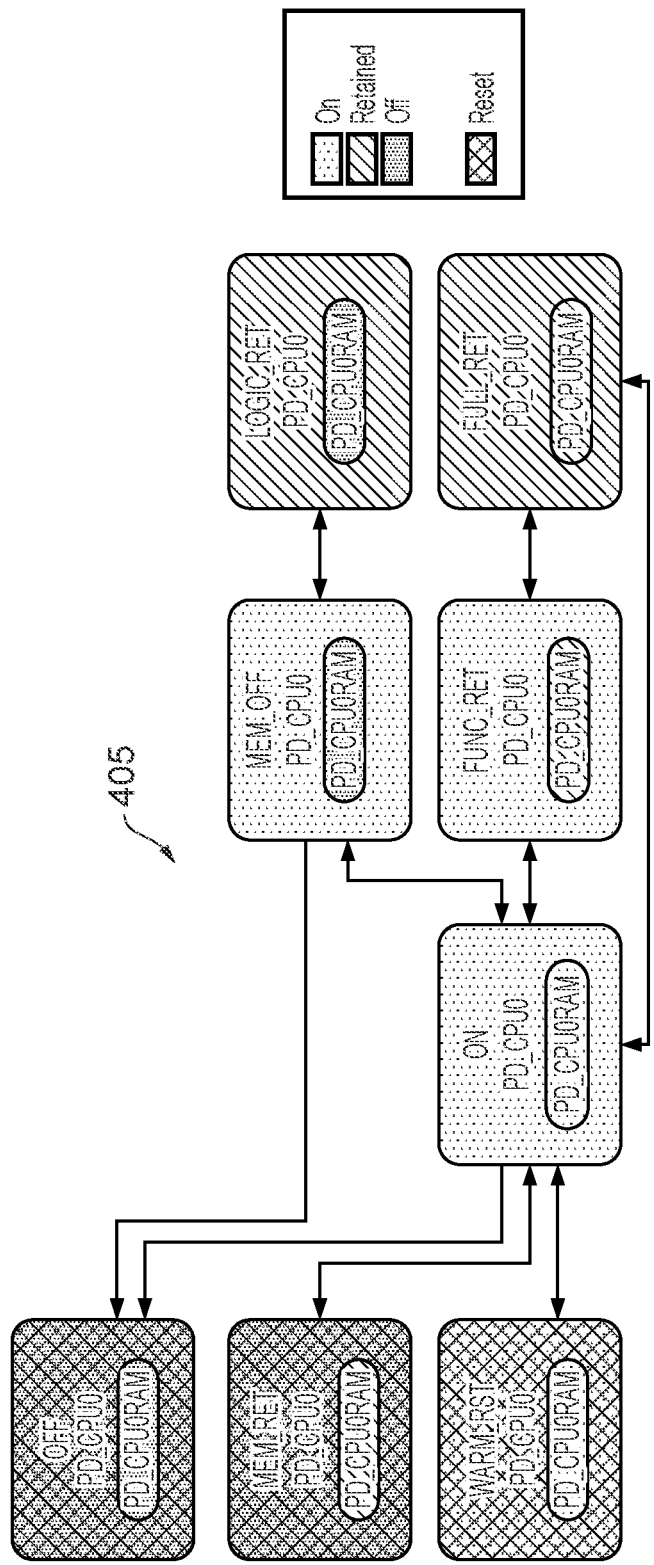

FIGS. 8A to 8C provide example power mode transition diagrams for the system power domain controller, CPU power domain controller and management power domain controller, respectively. As shown in FIG. 8A, the system power domain controller can transition between the five power modes shown, which include a power off mode, a power on mode, a warm reset mode, a full retention mode and a memory retention mode. FIG. 8A also shows the power mode applicable to the volatile memory 325 in each of the five power modes.

FIG. 8B similarly shows the various power modes available for the CPU power domain controller, and illustrates the power mode applied to the random access memory (RAM) power domain 350 in each of those different power modes. Again, it can be seen that there is a power off mode, a power on mode, and a warm reset mode, but in addition there are various different retention modes and a memory off mode.

FIG. 8C illustrates the power modes available for the management power domain controller, and in this particular example only three power modes are provided, namely an off power mode, an on power mode and a warm reset power mode.

Figure 9:
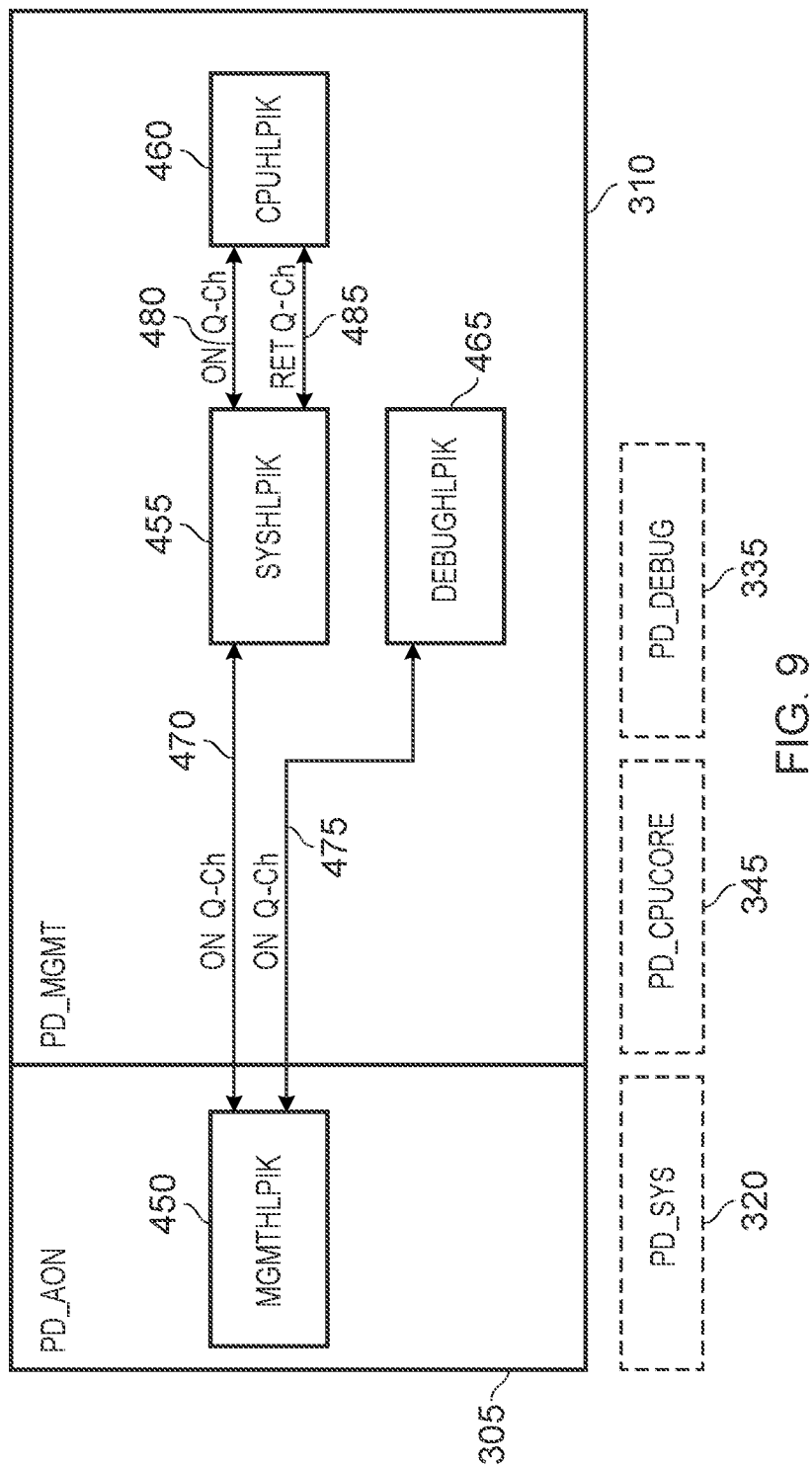
FIG. 9 illustrates connections between a management power controller, system power controller, debug power controller and CPU power controller, in accordance with one example implementation.

FIG. 9 is a diagram illustrating how the various power controllers may be provided in one particular example implementation. As shown, the management power controller 450 may be provided within the always on power domain 305, whilst the system power controller 455, debug power controller 465 and CPU power controller 460 are all provided within the management power domain 310 discussed earlier with reference to FIG. 7. Also shown are the system power domain 320, CPU core power domain 345 and debug power domain 335, and power to those power domains is controlled by the system power controller 455, CPU power controller 460 and debug power controller 465, respectively. As shown in FIG. 9, communication links 470, 475, 480, 485 are provided between the various power controllers in order to implement the earlier discussed hierarchical relationship. The communication links can be provided in a variety of ways. Hence, for example, in one implementation they may be provided by dedicated links of power controllers provided solely for the purposes of implementing the hierarchical relationship between the power controllers and allowing the power mode information to be exchanged between those power controllers. However, in an alternative implementation, existing interface structures within the power controllers can be reused in order to support the provision of the communication links. In the particular example implementation shown in FIG. 9, the power controllers take the form of Power Policy Units (PPUs) developed by Arm Limited, Cambridge, United Kingdom, and a clock Q-channel interface and power domain status information interface provided in those power controllers is used to enable the power controllers to be interconnected via the communication links.

In the example shown in FIG. 9, both an On Q-channel and a RET Q-channel are provided between the system power controller 455 and the CPU power controller 460, but the RET Q-channel is not used for the communication links with the management power controller 450. This is because the system power controller supports retention (RET), whilst the management power controller does not support retention, and so more minimum power modes can be defined for the system power controller than for the management power controller. In the Arm example implementation, Q-channels are used for transmitting the power domain constraining information. Given that Q-channels are simple handshake interfaces, one Q-channel can transmit a 1-bit power mode constraining information. For the management power controller 1 bit is sufficient, because the system power controller and debug power controller can only constrain whether the management power controller minimum power mode is ON. The system power controller is more complex, since it also supports RET. Its minimum power mode can be both ON or RET. Since one Q-channel can transmit 1-bit information, two Q-channels are used and in particular there are separate Q-channels for the transmission of the RET and ON minimum power modes, and their sum can be considered to form the power mode constraining information.

As will be apparent from the earlier discussed FIGS. 8A to 8C, not all of the power domains need to have available thereto the same set of power modes, but there will be in any particular implementation an understanding of the relative compatibility of the various power modes provided in the different power domains. By way of example, FIG. 10 is a table illustrating the power mode compatibility of the system and CPU power modes for the various different power modes shown in FIGS. 8A and 8B. It will be apparent that it can hence be determined, for any particular power mode that the reference power domain is in (also referred to in FIG. 10 as the state in which the reference power controller is in), which are the compatible power modes for the other power domain (also referred to in FIG. 10 as the state of the other power controller). Hence, purely by way of example, if the reference power domain is the system power domain, and the system power domain is in the full retention power mode, then the CPU power domain can be any of the full retention, logic retention, memory retention and off power modes. Conversely, if the system power domain is in the off power mode, then the CPU power domain must be in either the off or the memory retention power mode.

FIG. 11 is a table illustrating an example sequence 490 of transitions in power modes, and the steps taken to achieve those power mode transitions. Initially, it is assumed that the management power domain is in the on power mode, the system power domain is in the full retention power mode, and the CPU power domain is in the logic retention power mode. The table includes a generic description of the initial state, and also indicates the information transmitted over the on Q-channel and the retention Q-channel 480, 485 shown in FIG. 9 between the system PPU and the CPU PPU. As shown in the second row of the table 490, at some point the CPU PPU minimum power mode is changed from RET to OFF. At this point the CPU PPU intends to transition from the logic retention state through the memory off state to the off state shown in FIG. 8B. In order to do this, the CPU PPU requests the system PPU to enter the on power mode for the system power domain, and as shown by the third row in the table 490, on receiving the request from the CPU PPU, the system PPU causes the system power domain to transition to the on state from the full retention state. The system PPU then sends an acknowledgement back to the CPU PPU, after which the CPU PPU prevents the system PPU from exiting the on power mode through use of the on Q-channel.

As shown by the remaining rows in the table 490, once the system PPU has entered the on power mode for the system power domain, then the CPU PPU can manage the transitions from the logic retention to the memory off power mode, and from the memory off power mode to the off power mode. As shown by the final row in the table 490, once the CPU PPU has placed the CPU power domain into the off state, then the system PPU can change the system power domain into the off state if there is no request received by it indicating that a higher power mode is required.

Figure 12:
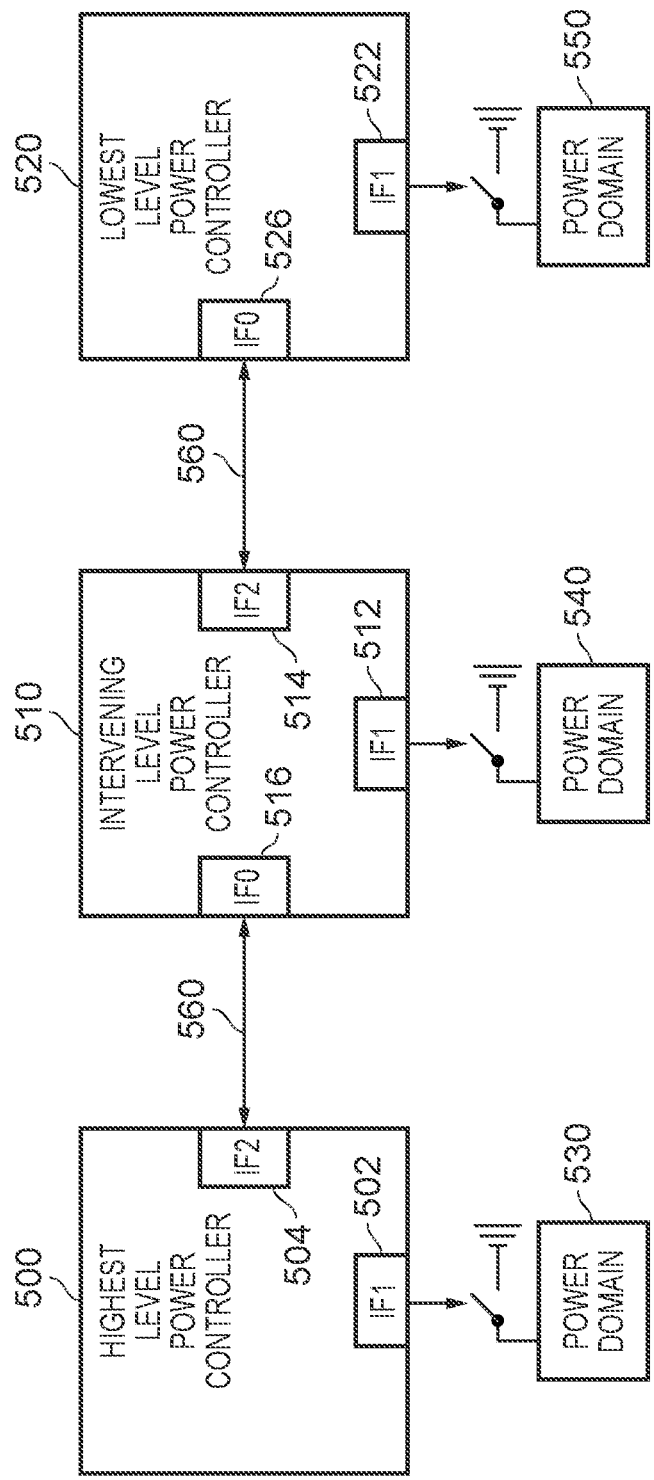
FIG. 12 illustrates interfaces that may be provided within the power controllers in one example implementation.

FIG. 12 is a block diagram illustrating some interfaces that may be provided in the various power controllers, in accordance with one example implementation. Each power controller that is not at the lowest level in the hierarchy or the highest level in the hierarchy will have three interfaces in the example implementation, and hence for the example the intervening level power controller 510 will have three interfaces. These three interfaces are labelled as interface 0 (IF0), interface 1 (IF1), and interface 2 (IF2). Hence, the intervening level power controller 510 has the three interfaces 512, 514, 516. A lower level power controller interface IF0 is connected to the interface IF2 of a higher level power controller, via a bidirectional link referred to herein as a communication link 560. As a result, the lowest level power controller 520 only has the two interfaces IF0 526 and IF1 522, and the highest level power controller 500 only has the two interfaces IF1 502 and IF2 504. As shown in the figures, the interface IF1 is used by each power controller to control operation of a switch in order to control the power supply of the associated power domains 530, 540, 550.

In accordance with the example implementation shown in FIG. 12, requests issued from the IF0 interface cannot be denied and requests issued from the IF1 interface cannot be denied. However, in one example implementation requests issued from the interface IF2 can be denied.

Further, although omitted from FIG. 12 for clarity, if a lower level power controller is connected to multiple higher level controllers, then the interface IF0 is duplicated for each higher level controller, and the duplicated interfaces operates simultaneously.

In one example implementation, when a request is received by a given power controller requesting that given power controller to increase its power mode, such requests cannot be denied. When the given power controller enters a higher level power mode, then the number of power modes that power domains higher in the hierarchy are allowed to be in can decrease. Similarly, when the given power controller enters a higher level power mode, the number of power modes that power domains lower in the hierarchy are allowed to be in can increase.

With regard to requests received requesting the given power controller to enter a lower power mode, then such requests cannot be denied except for when they have been issued from the second interface of a higher level power controller. When a power controller enters a lower level power mode, then the number of power modes that power domains higher in the hierarchy are allowed to be in can increase, whilst conversely the number of power modes the power domains lower in the hierarchy are allowed to be can decrease.

Figure 13:
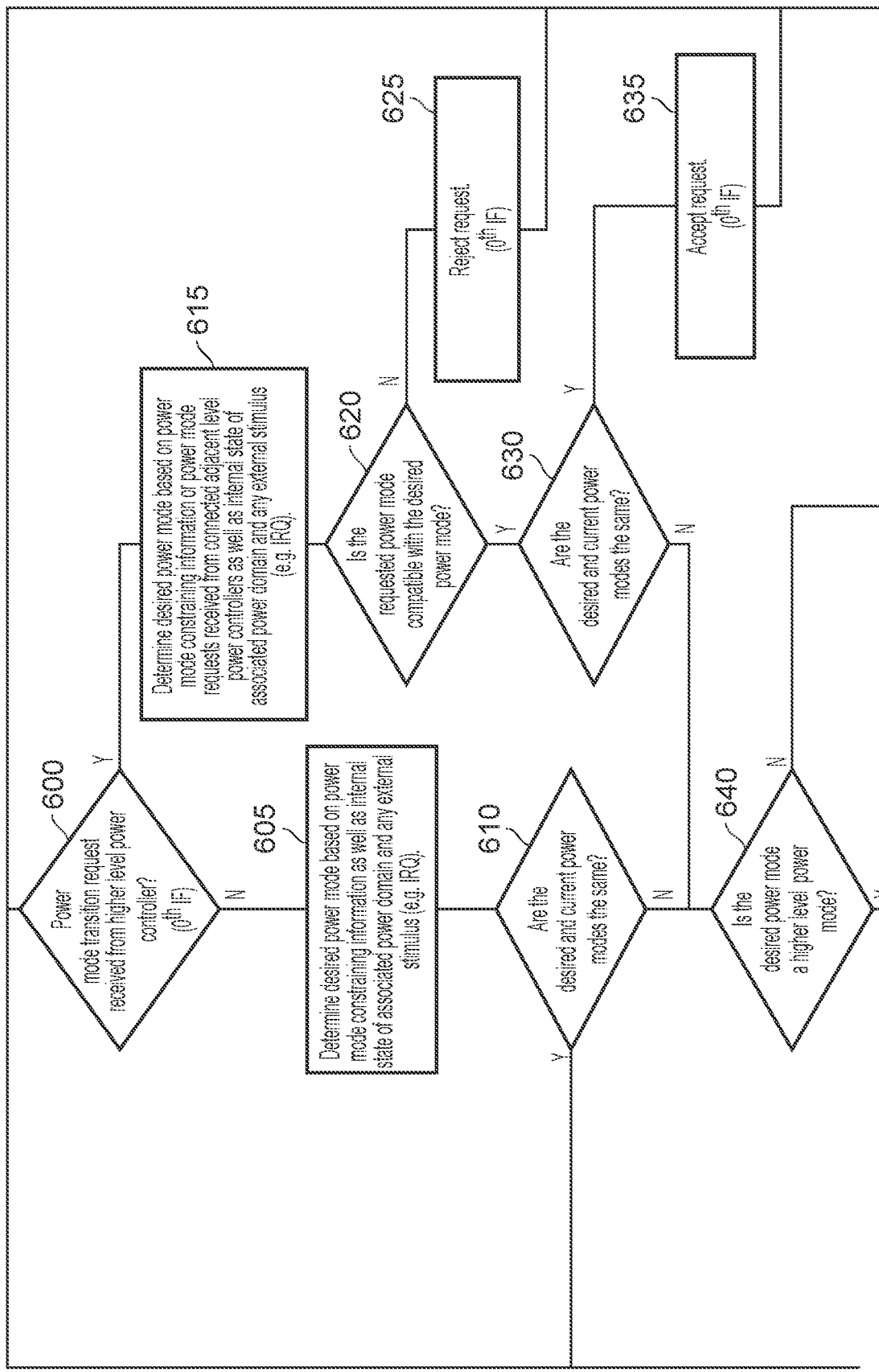
FIG. 13 is a flow diagram illustrating the operation of a power controller having the interfaces shown in FIG. 12, in accordance with one example implementation.
Figure 13:
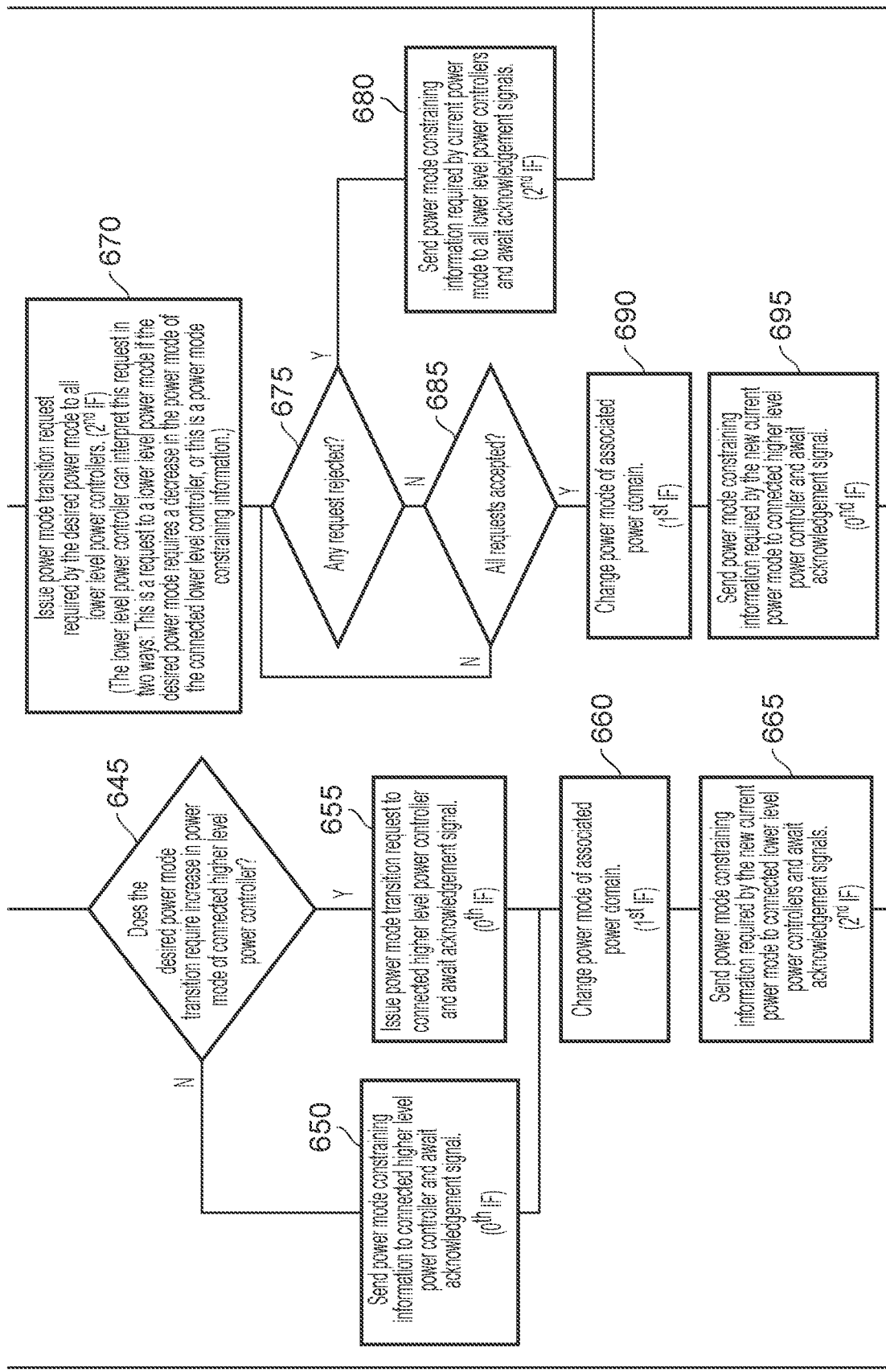

FIG. 13 is a flow diagram illustrating the operation of a given power controller that is arranged so as to have the interfaces shown in FIG. 12. At step 600, it is determined whether a power mode transition request is received from a higher level power controller at the interface IF0 of the given power controller. If so, then at step 615 a desired power mode for the associated power domain is determined based on power mode constraining information or power mode requests received from connected adjacent level power controllers, as well as internal state of the associated power domain and any external stimulus, for example an interrupt. Thereafter, at step 620 it is determined whether the requested power mode in the request received at step 600 is compatible with the desired power mode. If not, then the request is rejected at step 625, by issuing a reject signal from the interface IF0 of the given power controller. The process then returns to step 600.

If at step 620 it is determined that the requested power mode is compatible with the desired power mode, then it is determined at step 630 whether the desired and current power modes are the same. If so, the request is merely accepted by issuing an acknowledgement signal from the interface IF0 at step 635, whereafter the process returns to step 600. Otherwise, the process proceeds to step 640, which will be discussed in more detail later.

Returning to step 600, if it is determined that a power mode transition request has not been received from a higher level power controller, then at step 605 the desired power mode is determined based on power mode constraining information as well as internal state of the associated power domain and any external stimulus. At step 610 it is then determined whether the desired and current power modes are the same, and if so no further action is required and the process returns to step 600.

However, if at either step 610 or step 630 it is determined that the desired and current power modes are not the same, then the process proceeds to step 640 where it is determined whether the desired power mode is a higher level power mode. If the desired power mode is a higher level power mode, then it is determined at step 645 whether the desired power mode transition requires an increase in the power mode of a connected higher level power controller. If not, then at step 650 power mode constraining information is sent to the connected higher level power controller and an acknowledgement signal is awaited. This power mode constraining information is send from the interface IF0, and the acknowledgement will subsequently be received at the interface IF0.

However, if at step 645 it is determined that a transition is required in the power mode of the connected higher level controller, then at step 655 a power mode transition request is issued to the connected higher level power controller from the interface IF0, and an acknowledgement is awaited.

Upon receipt of the acknowledgment at either step 650 or step 655, then the power mode of the associated power domain is changed via the interface IF1. Thereafter, at step 665, power mode constraining information required by the new current power mode is sent via the interface IF2 to any connected lower level power controllers, and an acknowledgement signal is awaited. Thereafter, the process returns to step 600.

If at step 640 it is determined that the desired power mode is not a higher level power mode, then it is known that the desired power mode is a lower level power mode, and accordingly at step 670 a power mode transition request required by the desired power mode is issued to all lower level power controllers via the interface IF2. The lower level power controllers can interpret this request in two ways. Firstly, it will be interpreted as a request to change the power mode if the desired power mode requires a decrease in the power mode of the connected lower level power controller. However, if no change in the current power mode of the lower level power controller is required, then the lower level power controller will just treat the request as power mode constraining information.

At step 675, the given power controller will determine whether any request has been rejected, and if not will determine at step 685 whether all requests have been accepted. If a request is rejected at step 675, then at step 680 power mode constraining information required by the current power mode is sent to all lower level power controllers and acknowledgements signals are awaited, this information being propagated via the interface IF2. The process then returns to step 600 without the given power controller making any decrease to the power mode of its associated power domain.

If however, at step 685 it is determined that all requests have been accepted, then at step 690 the given power controller changes the power mode of its associated power domain by issuing an appropriate control signal via the interface IF1. Thereafter, at step 695 it sends power mode constraining information required by the new current power mode to the connected higher level power controller and awaits an acknowledgement signal, this signal being issued from the interface IF0. Thereafter, the process returns to step 600.

By utilising the techniques described herein, an efficient and effective hardware mechanism can be provided for ensuring that any power mode transitions made within a particular power domain are constrained to take into account any relationship with other power domains managed by different power controllers. In particular, by using communication links between the power controllers to implement a hierarchical relationship between them, this can avoid the need for the provision of software to seek to support the tight coupling of multiple power controllers. Dedicated interfaces may be provided within the power controllers to support the provision of the required communication links. However, in an alternative implementation it may be that the power controllers do not contain any such dedicated interfaces, and instead the communication links can be implemented by reusing interfaces provided by the power controllers for an alternative purpose.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A system comprising:
a plurality of power domains, each power domain comprising one or more components; and
a plurality of power controllers, wherein each power domain is associated with one of the power controllers, and the associated power controller is used to control transition of that power domain between a plurality of power modes;
wherein:
the plurality of power controllers are connected by communication links in order to implement a hierarchical relationship between the plurality of power controllers that comprises two or more hierarchical levels, such that each power controller other than a highest level power controller in the hierarchical relationship is connected by a communication link to an associated higher level power controller at a higher hierarchical level in the hierarchical relationship;
each given power controller is arranged to implement a power mode transition policy in order to control transition of the associated power domain between the plurality of power modes, the power mode transition policy taking into account power mode information received from any other power controller that the given power controller is connected to by a communication link, so as to constrain the power mode transitions within the associated power domain in accordance with the hierarchical relationship; and
the power mode information comprises power mode constraining information issued to the given power controller from an adjacent level power controller at an adjacent level in the hierarchical relationship over the communication link connecting the given power controller and the adjacent level power controller.

2. A system as claimed in claim 1, wherein the given power controller is arranged to take the power mode information into account when implementing the power mode transition policy in order to ensure that the associated power domain is prevented from being placed in a power mode that is higher than a current power mode being employed within a power domain associated with a higher level power controller connected to the given power controller.

3. A system as claimed in claim 1, wherein the given power controller is arranged to take the power mode information into account when implementing the power mode transition policy in order to ensure that the associated power domain is prevented from being placed in a power mode that is lower than a current power mode being employed within a power domain associated with a lower level power controller connected to the given power controller.

4. A system as claimed in claim 1, wherein the power mode constraining information indicates to the given power controller a particular power mode, and the given power controller is arranged when implementing the power mode transition policy in the presence of the power mode constraining information, to ensure that the associated power domain is retained in a power mode no lower than the particular power mode.

5. A system as claimed in claim 4, wherein the given power controller is arranged to receive the power mode constraining information from one or more connected adjacent level power controllers at a lower level in the hierarchical relationship.

6. A system as claimed in claim 5, wherein the given power controller is arranged when applying the power mode transition policy in the presence of power mode constraining information from multiple connected adjacent level power controllers, to ensure that the associated power domain is retained in a power mode no lower than the highest power mode from amongst the particular power modes specified by the power mode constraining information from the multiple connected adjacent level power controllers.

7. A system as claimed in claim 1, wherein the power mode constraining information comprises a power mode transition request issued to the given power controller from the adjacent level power controller to seek to cause the given power controller to change a current power mode of its associated power domain.

8. A system as claimed in claim 7, wherein the adjacent level power controller is arranged to issue the power mode transition request to the given power controller when the adjacent level power controller wishes to implement a change of power mode for its associated power domain that is currently prohibited by the hierarchical relationship, due to the current power mode of the given power controller's associated power domain.

9. A system as claimed in claim 7, wherein the given power controller is arranged to issue an acknowledgement signal to the adjacent level power controller when the power mode transition request has been actioned by the given power controller.

10. A system as claimed in claim 7, wherein the given power controller is at a higher level in the hierarchical relationship than the adjacent level power controller, and the power mode transition request is issued by the adjacent level power controller to seek to cause the given power controller to change the current power mode of its associated power domain to a higher power mode.

11. A system as claimed in claim 7, wherein the given power controller is at a lower level in the hierarchical relationship than the adjacent level power controller, and the power mode transition request is issued by the adjacent level power controller to seek to cause the given power controller to change the current power mode of its associated power domain to a lower power mode.

12. A system as claimed in claim 1, wherein each given power controller is arranged, when implementing the power mode transition policy in order to control transition of the associated power domain between the plurality of power modes, to take into account internal condition information of the associated power domain.

13. A system as claimed in claim 1, wherein each given power controller is arranged, when implementing the power mode transition policy in order to control transition of the associated power domain between the plurality of power modes, to take into account any external stimulus received by the given power controller.

14. A system as claimed in claim 1, wherein the communication links are bidirectional communication links.

15. A system as claimed in claim 1, wherein the communication links are connected to a low power interface of each given power controller.

16. A system as claimed in claim 1, wherein the communication links are implemented by reusing interfaces provided by the power controllers for an alternative purpose.

17. A system as claimed in claim 16, wherein said interfaces comprise clock control interfaces and power domain status information interfaces.

18. A system as claimed in claim 16, wherein said interfaces comprise power control interfaces for controlling the supply of power to each power domain controlled by the power controllers.

19. A system as claimed in claim 1, wherein the given power controller is arranged to take the power mode information into account when implementing the power mode transition policy in order to ensure that the given power controller is prevented from implementing a power mode transition of the associated power domain whilst any other power controller that the given power controller is connected to by a communication link is performing a power mode transition in respect of the associated power domain of that other power controller.

20. A method of controlling power mode transitions in a system, comprising:
providing within the system a plurality of power domains, each power domain comprising one or more components;
providing a plurality of power controllers, wherein each power domain is associated with one of the power controllers, and the associated power controller controls transition of that power domain between a plurality of power modes;
connecting the plurality of power controllers by communication links in order to implement a hierarchical relationship between the plurality of power controllers that comprises two or more hierarchical levels, such that each power controller other than a highest level power controller in the hierarchical relationship is connected by a communication link to an associated higher level power controller at a higher hierarchical level in the hierarchical relationship; and
implementing, within each given power controller, a power mode transition policy in order to control transition of the associated power domain between the plurality of power modes, the power mode transition policy taking into account power mode information received from any other power controller that the given power controller is connected to by a communication link, so as to constrain the power mode transitions within the associated power domain in accordance with the hierarchical relationship; wherein
the power mode information comprises power mode constraining information issued to the given power controller from an adjacent level power controller at an adjacent level in the hierarchical relationship over the communication link connecting the given power controller and the adjacent level power controller.

21. A system comprising:
a plurality of power domains, each power domain comprising one or more components; and
a plurality of power control means, wherein each power domain is associated with one of the power control means, and the associated power control means is for controlling transition of that power domain between a plurality of power modes;
wherein:
the plurality of power control means are connected by communication links in order to implement a hierarchical relationship between the plurality of power control means that comprises two or more hierarchical levels, such that each power control means other than a highest level power control means in the hierarchical relationship is connected by a communication link to an associated higher level power control means at a higher hierarchical level in the hierarchical relationship;
each given power control means for implementing a power mode transition policy in order to control transition of the associated power domain between the plurality of power modes, the power mode transition policy taking into account power mode information received from any other power control means that the given power control means is connected to by a communication link, so as to constrain the power mode transitions within the associated power domain in accordance with the hierarchical relationship; and
the power mode information comprises power mode constraining information issued to the given power control means from an adjacent level power control means at an adjacent level in the hierarchical relationship over the communication link connecting the given power control means and the adjacent level power control means.

* * * * *